73-632 SR

5/13/86 OR 4,587,848

United States Patent [19]

Nakamura et al.

[11] Patent Number: 4,587,848

[45] Date of Patent: May 13, 1986

[54] MECHANISM FOR ATTACHING ULTRASONIC HEAD OF ULTRASONIC MICROSCOPE

[75] Inventors: Yuzo Nakamura; Fumio Uchino; Hitoshi Tateoka; Junichi Ishibashi, all of Hachioji, Japan

[73] Assignee: Olympus Optical Co., Ltd., Tokyo, Japan

[21] Appl. No.: 664,429

[22] Filed: Oct. 24, 1984

[30] Foreign Application Priority Data

Nov. 2, 1983 [JP] Japan ................................ 58-204712

[51] Int. Cl.$^{4}$ ................................ G01N 29/04

[52] U.S. Cl. ................................ 73/632; 73/606; 310/336

[58] Field of Search ................ 73/606, 607, 632, 644; 310/334, 335, 336

[56] References Cited

U.S. PATENT DOCUMENTS

| | | | |
|---|---|---|---|
| 4,014,207 | 3/1977 | Meyer et al. | 73/621 |
| 4,378,699 | 4/1983 | Wickramasinghe | 73/606 |
| 4,505,160 | 3/1985 | Zacharias, Jr. | 310/336 |

*Primary Examiner*—Stephen A. Kreitman

*Attorney, Agent, or Firm*—Parkhurst & Oliff

[57] ABSTRACT

A mechanism for attaching an ultrasonic head of an ultrasonic microscope to a vibration shaft of a vibrator is disclosed. A first connector half to which an R.F. cable is connected is fixedly arranged to the vibration shaft and a second connector half having the ultrasonic head coupled therewith is detachably attached to the first connector half, so that an exchange of the ultrasonic head can be performed in an easy and swift manner without affecting the position and characteristics of the R.F. cable.

9 Claims, 2 Drawing Figures

MECHANISM FOR ATTACHING ULTRASONIC HEAD OF ULTRASONIC MICROSCOPE

BACKGROUND OF THE INVENTION

The present invention relates to an ultrasonic microscope, especially to a mechanism for detachably attaching an ultrasonic head to a vibration shaft of a vibrator.

Usually, in case of displaying an ultrasonic image of a specimen by means of the ultrasonic microscope, use is made of a two-dimensional scanning such that the vibration shaft of the vibrator to which is secured the ultrasonic head having a piezoelectric transducer is vibrated at a high speed in X direction so as to effect a main-scanning, while a specimen stage on which the specimen is placed is moved at a low speed in Y direction to effect a sub-scanning. In the known vibrator, as shown in FIG. 1, an ultrasonic head 1 comprising an acoustic lens and a piezoelectric transducer is secured to an arm 2 and the arm 2 is connected to one end of a vibration shaft 3 of the vibrator. The other end of the vibration shaft 3 is connected to a bobbin of a voice coil 7 wounded between a yoke 5 and a pole-piece 6 so as to cross a magnetic field generated by a magnetic circuit consisting of a magnet 4, the yoke 5 and the pole-piece 6, and is movably supported by a leaf spring 8 in a direction perpendicular to an ultrasonic wave emitting direction from the ultrasonic head 1 i.e. an axial direction of the voice coil 7. It is possible to vibrate the ultrasonic head 1 in X direction by supplying a predetermined alternating current to the voice coil 7.

In the known ultrasonic microscope mentioned above, in order to vary or change a frequency of the ultrasonic wave so as to vary a resolution of the image, it is necessary to exchange the ultrasonic head 1 by another ultrasonic head. In this case, the ultrasonic head 1 is fixedly secured to the arm 2 and this arm 2 is detachably secured to the vibration shaft 3 by means of screws 9. Therefore, there is a drawback that a troublesome work is required every time the ultrasonic head 1 is exchanged. In addition, a radio-frequency (R.F.) cable 10, i.e. a high-frequency coaxial cable is connected to the piezoelectric transducer of the ultrasonic head 1. Therefore, the influence of the R.F. cable 10 upon the vibrator is varied due to the position and the characteristics of the R.F. cable, so that the ultrasonic head 1 cannot be moved linearly at a constant speed within a range of the vibration and thus there is a drawback that the ultrasonic image having high resolution cannot be obtained. These drawbacks occur particularly when the large scanning region obtained by making the range of the vibration large is required.

SUMMARY OF THE INVENTION

The present invention has for its object to eliminate the drawbacks mentioned above and to provide an ultrasonic microscope in which an ultrasonic head can be detachably secured to a vibrator in an extremely simple manner.

Another object of the invention is to provide an ultrasonic microscope in which even in case of exchanging the ultrasonic head the head can be accurately vibrated at a constant speed within a desired range of the vibration.

According to the invention, a mechanism for attaching an ultrasonic head of an ultrasonic microscope to a vibration shaft of a vibrator, comprises a first connecting means fixedly arranged to the vibration shaft of the vibrator, to which an R.F. cable is connected; and a second connecting means having the ultrasonic head coupled therewith and being detachably attached to said first connecting means.

DESCRIPTION OF THE PREFERRED EMBODIMENTS

Figure 1:
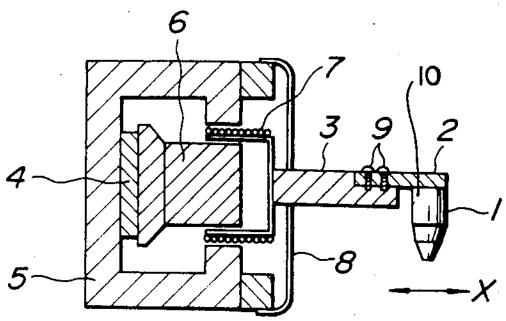
FIG 1 PRIOR ART
FIG. 1 is a cross sectional view showing one embodiment of a vibrator of the known ultrasonic microscope, to which the ultrasonic head is attached.
Figure 2:
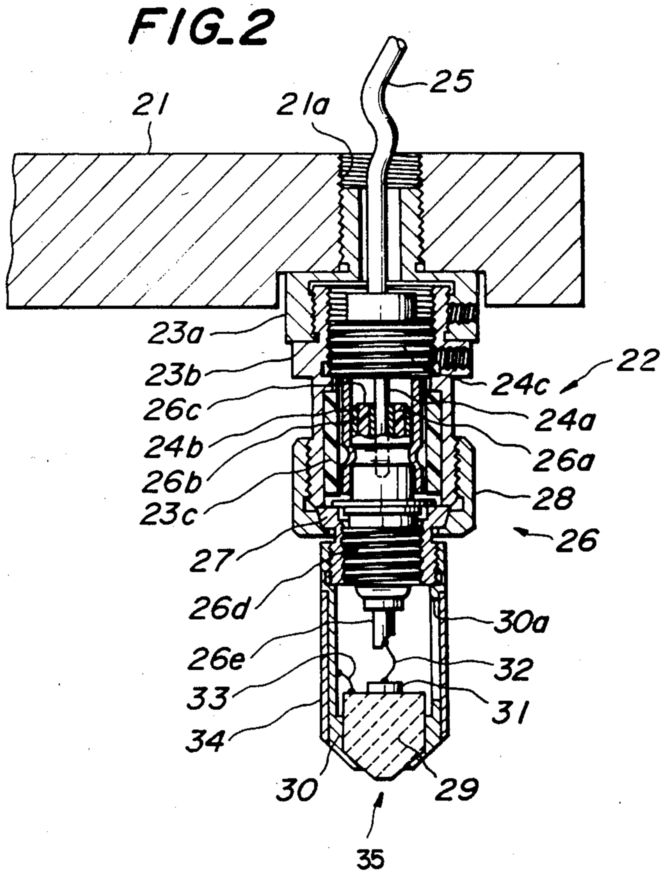
FIG. 2 is a cross sectional view illustrating one embodiment of the mechanism for attaching the ultrasonic head according to the invention.

FIG. 2 is a cross sectional view showing one embodiment of the mechanism for attaching an ultrasonic head to a vibration shaft of a vibrator according to the invention. In this embodiment, in a vibration shaft 21 there is formed a threaded hole **21*a* near its free end. According to the invention, one half of an R.F. connector, i.e. a male connector 22 is fixed to the vibration shaft 21. To this end a male connector supporting member 23*a* is screwed into the threaded hole 21*a*. The male connector supporting member 23*a* comprises a threaded hole into which an upper end of a male connector holding member 23*b* is screwed. Then into the male connector holding member 23*b* is screwed a male connector main body comprising a centrally arranged contact pin 24*a*, a shield sleeve 24*b* and a base portion 24*c* supporting the pin 24*a* and shield sleeve 24*b* in position. In the present embodiment, there is further arranged an insulating ring 23*c* between the male connector holding member 23*b* and shield sleeve 24*b*, but such an insulating ring 23*c* may be dispensed with. A core conductor and a shielding conductor of an R.F. cable 25 are electrically connected to the contact pin 24*a* and shield sleeve 24*b***, respectively in known manner.

A female connector 26 comprises a female connector main body including an inner sleeve **26*a* into which the contact pin 24*a* of the male connector 22 is to be inserted, an outer sleeve 26*b* which is to be inserted into the shield sleeve 24*b* of the male connector 22, the inner and outer sleeves being separated by an insulating ring 26*c*, and a base portion 26*d* supporting the inner and outer sleeves 26*a* and 26*b* and the insulating ring 26*c* in position. The female connector main body is screwed to a female connector holding member 27, around which a coupling ring 28 is arranged rotatably. Inner surface of the coupling ring 28 is threaded and is detachably screwed to an outer threaded surface of the male connector holding member 23*b*. To a lower end of the base portion 26*d* is secured a core pin 26*e* which is connected to the inner sleeve 26*a*. To a lower end of the female connector holding member 27 is screwed an ultrasonic head 35 comprising an acoustic lens 29 supported by a lens holder 30, and a piezoelectric transducer 31 applied on an upper surface of the lens 29. An upper electrode of the piezoelectric element 31 is connected to the core conductor 26*e* via a wire 32 and a lower electrode of the piezoelectric element is connected by means of a wire 33 to the lens holder 30. Thus the lens holder 30 is made of a metal and serves as a conductor. The lens holder 30 is connected to the outer sleeve 26*b* via the conductive female connector supporting member 27 and base portion 26*d*. In order to connect the wires 32 and 33 by soldering, in the lens holder 30 is formed a window 30*a* through which the wires can be accessed. After that the window 30*a* is closed by a cover ring 34**.

In the present embodiment, by unscrewing the coupling ring 28, it is possible to remove the female connector 26 together with the ultrasonic head 35 from the fixedly arranged male connector 22. Then another female connector having an ultrasonic head different from the first one may be attached to the male connector 22. In this manner, the ultrasonic head can be exchanged easily and quickly. It should be noted that since the R.F. cable 25 is not necessary to be exchanged, it can be firmly secured to the vibration shaft 21. Therefore, the influence of the cable is not varied at all by exchanging the ultrasonic head.

In the ultrasonic microscope according to the invention, one half of the connector consisting of the male R.F. connector 22 and the R.F. cable 25 are fixedly connected to the vibration shaft 21 and the female R.F. connector 26 having the ultrasonic head 35 coupled therewith is detachably connected to the male connector 22. Therefore, by preparing a plurality of female connectors having different ultrasonic heads coupled therewith, it is possible to exchange the ultrasonic head in an easy and swift manner by connecting selectively one desired female R.F. connector to the male R.F. connector fixedly connected to the vibration shaft. Further, since the R.F. cable 25 is fixedly connected to the male R.F. connector fixed to the vibration shaft and is commonly used for all the ultrasonic heads, the effect of the R.F. cable 25 upon the vibrator is not varied at all and thus it is possible to perform the accurate vibration. In this case, it is preferable to arrange a suitable balance weight to each detachable connector halves so as to make all the detachable connector halves equal in weight.

The present invention is not limited to the embodiment mentioned above, but various modifications are possible. For example, the type of the R.F. connector is not limited to the embodiments mentioned above, but various types of the R.F. connector can be used. However, a connector which generates an undesired vibration in case of being vibrated by the vibrator and loosen the connection should not be used. Moreover, as for the ultrasonic head, use may be made of an ultrasonic head having no acoustic lens, which can focus the ultrasonic beam by curving the piezoelectric transducer itself.

As clearly understood from the above, according to the invention, one half of the R.F. connector is fixed to the vibration shaft of the vibrator and the R.F. cable is connected to this connector half. In addition, the other half of the R.F. connector having the ultrasonic head connected thereto is detachably connected to the connector half fixed to the vibration axis of the vibrator. Therefore, it is possible to exchange the ultrasonic head in an extremely easy manner. Moreover, since the position of the R.F. cable is not varied at all even in case of exchanging the ultrasonic head, the influence of the cable upon the vibrator is not varied at all and thus it is possible to perform always an accurate scanning operation.

What is claimed is:

1. A mechanism for attaching an ultrasonic head to an ultrasonic microscope main body, comprising a first connecting means fixedly arranged to the ultrasonic microscope main body, to which an R.F. cable is connected; and second connecting means having an ultrasonic head coupled therewith and being detachably attached to said first connecting means.

2. A mechanism according to claim 1, wherein said first connecting means and second connecting means are formed by first and second R.F. connector halves, respectively.

3. A mechanism according to claim 2, wherein said first R.F. connector half fixed to said vibration shaft comprises a male connector supporting member engaged with a screw hole provided in said vibration shaft, a male R.F. connector holding member engaged with said male connector supporting member, and a male R.F. connector main body provided in said male R.F. connector holding member and having a center pin and a shield sleeve connected to the R.F. cable.

4. A mechanism according to claim 3, wherein said second R.F. connector half comprises a lens holder holding an acoustic lens and a piezoelectric transducer, a female R.F. connector holding member engaged with an upper portion of said lens holder, a female R.F. connector main body provided in said female R.F. connector holding member having inner and outer sleeves connected to electrodes of said piezoelectric transducer, sand inner and outer sleeves being electrically connected to said central pin and shield sleeve of the male connector main body.

5. A mechanism according to claim 4, wherein a lower electrode of said piezoelectric transducer is connected through a lead wire to said lens holder which is further connected to said outer sleeve, and an upper electrode thereof is connected through a lead wire to a conductive core pin which is further connected to said inner sleeve.

6. A mechanism according to claim 4, further comprising a coupling ring for connecting firmly said first R.F. connector half and said second R.F. connector half.

7. A mechanism according to claim 5, wherein said lens holder has a window through which said lead wires can be accessed and the mechanism further comprises a cover ring closing said window.

8. A mechanism according to claim 1, wherein said first connecting means is fixedly sucured to a vibration shaft of the ultrasonic microscope main body.

9. A mechanism according to claim 8, wherein said the first connecting means and second connecting means are formed by first and second RF connector halves respectively.

* * * * *